(12) United States Patent
Zhang (10) Patent No.: US 12,386,247 B1
(45) Date of Patent: Aug. 12, 2025

(54) ROTATING PHOTO BOOTH

(71) Applicant: Shenzhen Yuntaida Technology Co., Ltd., Shenzhen (CN)

(72) Inventor: FeiXiang Zhang, Shenzhen (CN)

(73) Assignee: Shenzhen Yuntaida Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/019,529

(22) Filed: Jan. 14, 2025

(30) Foreign Application Priority Data

Dec. 23, 2024 (CN) .......... 202411897502.9

(51) Int. Cl.
*G03B 17/56* (2021.01)
*F16M 11/20* (2006.01)
*F16M 11/28* (2006.01)

(52) U.S. Cl.
CPC ....... *G03B 17/561* (2013.01); *F16M 11/2014* (2013.01); *F16M 11/28* (2013.01)

(58) Field of Classification Search
CPC .... G03B 17/48; G03B 17/561; G03B 17/563; G03B 15/03; G03B 15/035; G03B 15/06; G03B 2215/0575; G03B 2215/0582; G03B 2215/0585; H04N 5/222; F16M 11/08; F16M 11/28; F16M 13/02; F16M 13/022; F16M 13/04; F16M 11/2014; F16M 11/2021; F16M 11/18
See application file for complete search history.

(56) References Cited

U.S. PATENT DOCUMENTS 11,500,271 B2 11/2022 Liu et al.

FOREIGN PATENT DOCUMENTS

| CN | 117889306 A | * | 4/2024 |
| CN | 118188965 A | * | 6/2024 |
| KR | 102320398 B1 | * | 11/2021 |

* cited by examiner

*Primary Examiner* — Stephanie E Bloss
*Assistant Examiner* — Fang-Chi Chang
(74) *Attorney, Agent, or Firm* — Ricky Lam (57) ABSTRACT

The present disclosure provides a rotating photo booth, wherein the rotating photo booth comprises: a base unit comprising an annular rail component; a photographic bracket which is rotatable around the base unit; a driving unit configured to drive the photographic bracket to rotate around the base unit along the annular rail component; and a sliding unit configured to match the annular rail component.

5 Claims, 5 Drawing Sheets

ROTATING PHOTO BOOTH

FIELD

The present disclosure relates to the field of photography, and more specifically, to a rotating photo booth.

BACKGROUND

The demand for intelligent, easy-to-use, and entertaining photographic device has increased with the development of society. The traditional photographic method requires a person to hold a camera or photographic device and take pictures of the object or human body of interest. There are also camera or photographic device brackets in this field, but these brackets often remain fixed and require manual movement when needed. This limits the ability to capture this unique cinematic effect in an economically efficient and timely manner. This field requires a portable device capable of capturing the desired cinematic effects. The present disclosure provides a rotatable photo booth, in which a photographic bracket equipped with a camera or photographic device can move around a base along a guide rail and take photos during rotation.

SUMMARY

The present disclosure proposes a rotating photo booth, which is a portable device capable of capturing the desired movie effect. The photographic bracket equipped with a camera or photographic device can rotate around the base in the circumferential direction and take photo during rotation.

In view of the above and other ideas, the present disclosure is proposed.

According to one aspect of the present disclosure, there is provided a rotating photo booth comprising:
  a base unit comprising an annular rail component;
  a photographic bracket which is rotatable around the base unit;
  a driving unit configured to drive the photographic bracket to rotate around the base unit along the annular rail component; and
  a sliding unit configured to match the annular rail component.

In one embodiment, the base unit further comprises an annular toothed rail connected to the annular rail component, and a tooth surface of the annular toothed rail is distributed along an outer circumferential surface of the annular toothed rail.

In one embodiment, the driving unit comprises a motor and a driving wheel connected to an output end of the motor, the driving wheel meshes with the tooth surface of the annular toothed rail, and the annular toothed rail remains stationary, so that the driving wheel rotates along the tooth surface of the annular toothed rail under the driving of the motor.

In one embodiment, the annular rail component comprises a first circle rail and a second circle rail, wherein the first circle rail and the second circle rail are grooves provided on a radially outer and inner sides of the annular rail component, and the grooves extend circumferentially along the radially outer and inner sides of the annular rail component.

In one embodiment, the sliding unit comprises a first pulley component and a second pulley component, wherein the first pulley component matches the first circle rail, and the second pulley component matches the second circle rail.

In one embodiment, the rotating photo booth further comprises a first connection unit, wherein the first connection unit is used to carry the photographic bracket, the driving unit, and the sliding unit.

In one embodiment, the sliding unit further comprises a sliding plate, the first pulley component and the second pulley component are installed on the sliding plate, and the sliding plate is installed on the first connection unit.

In one embodiment, the photographic bracket comprises a second connection unit connected to the first connection unit, a third connection unit detachably connected to the second connection unit, and a telescopic rod connected to the third connection unit, wherein the telescopic rod is configured to connect photographic device.

In one embodiment, the telescopic rod is rotatably connected to the third connection unit, and an angle adjustment arm is further connected between the telescopic rod and the third connection unit, forming a triangular fixed structure between the angle adjustment arm, the telescopic rod, and the third connection unit.

In one embodiment, the grooves extend radially along the outer and inner sides of the annular rail component to form trenches.

In one embodiment, trajectories of the first circle rail and the second circle rail form concentric circles, and the radius of the trajectory of the first circle rail is greater than that of the trajectory of the second circle rail.

In one embodiment, the rotating photo booth further comprises a driving control unit, wherein the driving control unit comprises a voice control device and a speaker device, wherein the voice control device is configured to control power on, power off, and speed adjustment of the rotating photo booth through voice commands, and the speaker device is configured to emit sound in response to the voice commands.

In one embodiment, the base unit further comprises multiple supporting legs that support the base unit and can be used to adjust the height of the base unit.

In one embodiment, the rotating photo booth further comprises a power module for supplying power to the voice control device, the speaker device, and the driving unit.

According to another aspect of the present disclosure, there is provided a rotating photo booth comprising:
  a base unit comprising an annular skeleton, wherein the annular skeleton is provided with an annular rail and a tooth surface, and the annular rail and the tooth surface extend along an outer circumferential surface of the annular skeleton;
  a photographic bracket which is rotatable around the base unit;
  a driving unit configured to drive the photographic bracket to rotate around the base unit along the annular rail; and
  a sliding unit configured to match the annular rail.

In one embodiment, the portion of the annular skeleton provided with the annular rail constitutes an annular rail component, and the portion of the annular skeleton provided with the tooth surface constitutes an annular toothed rail.

In one embodiment, the annular rail component is detachably connected to the annular toothed rail.

In one embodiment, the driving unit comprises a motor and a driving wheel connected to an output end of the motor, the driving wheel meshes with the tooth surface of the annular toothed rail, and the annular toothed rail remains stationary, so that the driving wheel rotates along the tooth surface of the annular toothed rail under the driving of the motor.

In one embodiment, the annular rail component comprises a first circle rail and a second circle rail, wherein the first circle rail and the second circle rail are grooves provided on a radially outer and inner sides of the annular rail component, and the grooves extend circumferentially along the radially outer and inner sides of the annular rail component.

In one embodiment, the sliding unit comprises a first pulley component and a second pulley component, wherein the first pulley component matches the first circle rail, and the second pulley component matches the second circle rail.

In one embodiment, the rotating photo booth further comprises a first connection unit, wherein the first connection unit is used to carry the photographic bracket, the driving unit, and the sliding unit.

In one embodiment, the sliding unit further comprises a sliding plate, the first pulley component and the second pulley component are installed on the sliding plate, and the sliding plate is installed on the first connection unit.

In one embodiment, the photographic bracket comprises a second connection unit connected to the first connection unit, a third connection unit detachably connected to the second connection unit, and a telescopic rod connected to the third connection unit, and the telescopic rod is configured to connect photographic device, and the telescopic rod is rotatably connected to the third connection unit, and an angle adjustment arm is further connected between the telescopic rod and the third connection unit, forming a triangular fixed structure between the angle adjustment arm, the telescopic rod, and the third connection unit.

In one embodiment, the grooves extend radially along the outer and inner sides of the annular rail component to form trenches.

In one embodiment, the trajectories of the first circle rail and the second circle rail form concentric circles, and the radius of the trajectory of the first circle rail is greater than that of the trajectory of the second circle rail.

In one embodiment, the rotating photo booth further comprises a driving control unit, wherein the driving control unit comprises a voice control device and a speaker device, wherein the voice control device is configured to control power on, power off, and speed adjustment of the rotating photo booth through voice commands, and the speaker device is configured to emit sound in response to the voice commands.

In one embodiment, the base unit further comprises multiple supporting legs that support the base unit and can be used to adjust the height of the base unit.

In one embodiment, the rotating photo booth further comprises a power module for supplying power to the voice control device, the speaker device, and the driving unit.

According to another aspect of the present disclosure, there is provided a rotating photo booth comprising:
 a base unit comprising a supporting skeleton, wherein the supporting skeleton is provided with a first circle rail, a second circle rail, and a tooth surface, and the first circle rail, the second circle rail, and the tooth surface extend along circumferential surfaces of the supporting skeleton;
 a photographic bracket, the photographic bracket can rotate around the base unit;
 a driving unit configured to drive the photographic bracket to perform a surrounding motion around the base unit along the first circle rail and the second circle rail; and
 a sliding unit configured to match the first circle rail and the second circle rail,
 wherein, trajectories of the first circle rail and the second circle rail form concentric circles, and the radius of the trajectory of the first circle rail is greater than that of the trajectory of the second circle rail.

In one embodiment, the base unit further comprises an annular toothed guiding component, and a tooth surface of the annular toothed guiding component is distributed along an outer circumferential surface of the annular toothed guiding component.

In one embodiment, the driving unit comprises a motor and a driving wheel connected to an output end of the motor, wherein the driving wheel meshes with the tooth surface of the annular toothed guiding component, and the annular toothed guiding component remains stationary, such that the driving wheel rotates along the tooth surface of the annular toothed guiding component under the driving of the motor.

In one embodiment, the sliding unit comprises a first pulley component and a second pulley component, wherein the first pulley component is matched with the first circle rail, and the second pulley component is matched with the second circle rail.

In one embodiment, the rotating photo booth further comprises a first connection unit for carrying the photographic bracket, the driving unit, and the sliding unit.

In one embodiment, the sliding unit further comprises a sliding plate, wherein the first pulley component and the second pulley component are mounted on the sliding plate, and the sliding plate is mounted on the first connection unit.

In one embodiment, the photographic bracket comprises a second connection unit connected to the first connection unit, a third connection unit detachably connected to the second connection unit, and a telescopic rod connected to the third connection unit, wherein the telescopic rod is configured to connect photographic device.

In one embodiment, the telescopic rod is rotatably connected to the third connection unit, and an angle adjustment arm is also connected between the telescopic rod and the third connection unit and forms a triangular fixed structure with the telescopic rod and the third connection unit.

In one embodiment, the rotating photo booth further comprises a driving control unit, wherein the driving control unit comprises a voice control device and a speaker device, wherein the voice control device is configured to control power on, power off, and speed adjustment of the rotating photo booth through voice commands, and the speaker device is configured to emit sound in response to the voice commands.

In one embodiment, the base unit further comprises multiple supporting legs that support the base unit and can be used to adjust the height of the base unit.

In one embodiment, the rotating photo booth further comprises a power module for supplying power to the voice control device, the speaker device, and the driving unit.

More embodiments of the present disclosure can also achieve other advantageous technical effects not listed one by one, which may be partially described in the following text and can be expected and understood by those skilled in the art after reading the present disclosure.

BRIEF DESCRIPTION OF THE DRAWINGS

In order to provide a clearer explanation of the technical solution in the embodiments of the present application, a brief introduction will be given below to the accompanying drawings required in the embodiments or prior art descriptions. It is evident that the accompanying drawings in the following description are only some embodiments of the present application. For those skilled in the art, other accompanying drawings can be obtained based on these drawings without the need for creative labor.

DETAILED DESCRIPTION

In order to clarify the purpose, technical solution, and advantages of the embodiments of the present disclosure, the following will provide a clear and complete description of the technical solution in the embodiments of the present disclosure in conjunction with the accompanying drawings. Obviously, the described embodiments are one part of the embodiments of the present disclosure, not all of them. The components of the embodiments of the present disclosure described and illustrated in the accompanying drawings can be arranged and designed in various different configurations.

Therefore, the detailed description of the embodiments of the present disclosure provided in the accompanying drawings is not intended to limit the scope of the present disclosure, but only to represent selected embodiments of the present disclosure. Based on the embodiments in the present disclosure, all other embodiments obtained by ordinary skilled persons in this field without creative labor are within the scope of protection of the present disclosure.

It should be noted that similar labels and letters represent similar items in the following figures. Therefore, once an item is defined in one figure, it does not need to be further defined and explained in subsequent figures.

It should be understood that the terms "up", "down", "front", "back", "left", "right", "horizontal", etc. indicate the orientation or position relationship based on the orientation or position relationship shown in the drawings, only for the convenience of describing and simplifying the description of the present application, rather than indicating or implying that the device or component referred to must have a specific orientation, be constructed and operated in a specific orientation, and therefore cannot be understood as a limitation of the present application. In addition, the terms "first", "second", "third", etc. are only used to distinguish descriptions and cannot be understood as indicating or implying relative importance. In the description of the present disclosure, unless otherwise specified, the meaning of "multiple" refers to two or more.

As used in this application, the terms "installation", "connection", "connecting", "fixed" and other terms should be broadly understood, for example, they can be fixed connections, detachable connections, or integrated connections; It can be a mechanical connection or an electrical connection; It can be directly connected, or indirectly connected through an intermediate medium, or it can be an internal connection between two components. For ordinary technical personnel in this field, the specific meanings of the above terms in this application can be understood based on specific circumstances.

In the present disclosure, unless otherwise specified and limited, the first feature above or below the second feature may include direct contact between the first and second features, or may include contact between the first and second features through another feature between them instead of direct contact. Moreover, the first feature being "above", and "on" the second feature includes the first feature being directly above and diagonally above the second feature, or simply indicating that the first feature is horizontally higher than the second feature. The first feature being "below" include the first feature being directly below and diagonally below the second feature, or simply indicating that the first feature has a lower horizontal height than the second feature.

As used in the present disclosure, "circumferential" refers to circumferential direction. As used in the present disclosure, "axial" usually refers to the direction of the central axis of rotation of a cylindrical object, that is, the direction of the central axis. The "radial" is perpendicular to the "axial" direction, which is the radius or diameter direction of the end face circle of the cylinder. The radial and axial are perpendicular in the space.

The embodiments of the present disclosure are described in detail below, and examples of the embodiments are shown in the accompanying drawings, where the same or similar reference numerals from beginning to end represent the same or similar elements or elements with the same or similar functions. The embodiments described below with reference to the accompanying drawings are exemplary and are only used to explain the present disclosure, and should not be understood as limiting the present disclosure.

Figure 1:
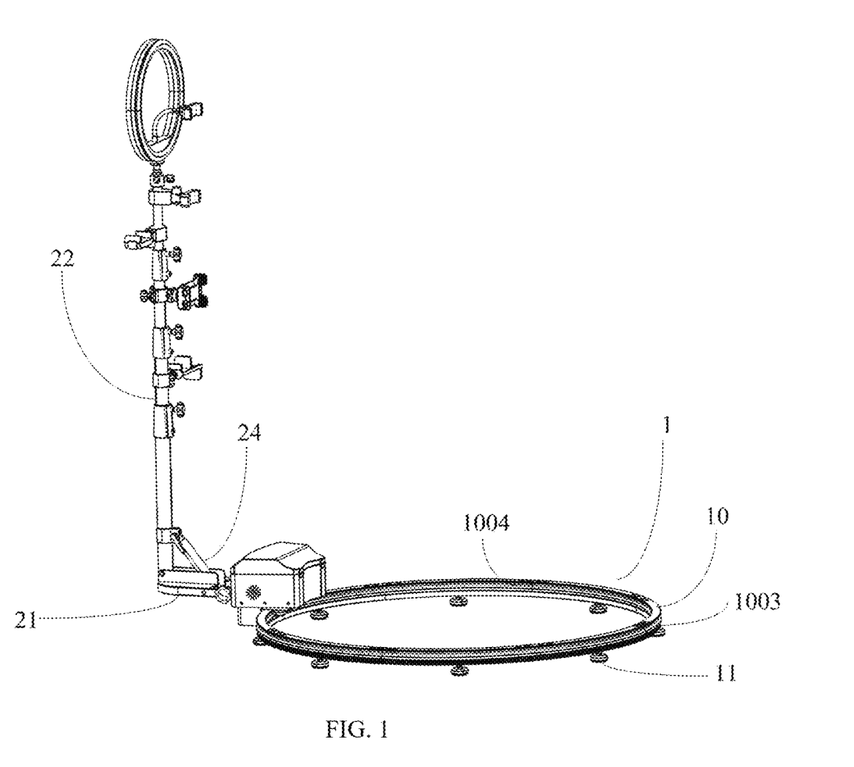
FIG. 1 shows a perspective view of the rotating photo booth of the present disclosure.

FIG. 1 shows a rotating photo booth, which is a portable device capable of capturing the desired movie effect. The photographic bracket, which is equipped with a camera or photographic device, can rotate around the base in the circumferential direction and take photos during the rotation process. As shown in FIGS. 1-5, the rotating photo booth comprises: a base unit 1, which includes an annular rail component 100; a photographic bracket 2, which can rotate around the base unit 1; a driving unit 3 configured to drive the photographic bracket 2 to rotate around the base unit 1 along the annular rail component 100; a sliding unit 4 configured to match the annular rail component 100. As shown in FIG. 3, the base unit 1 also includes an annular toothed guiding component 101 connected to the annular rail component 100, and the tooth surface 1010 of the annular toothed guiding component 101 is distributed along an outer circumferential surface of the annular toothed guiding component 101. Objects or people can be placed or stand on the base unit 1. When the photographic bracket 2 rotates, the base unit 1 remains stationary to prevent users on the base unit 1 from feeling dizzy due to instability or rotation of the base unit 1.

Figure 2:
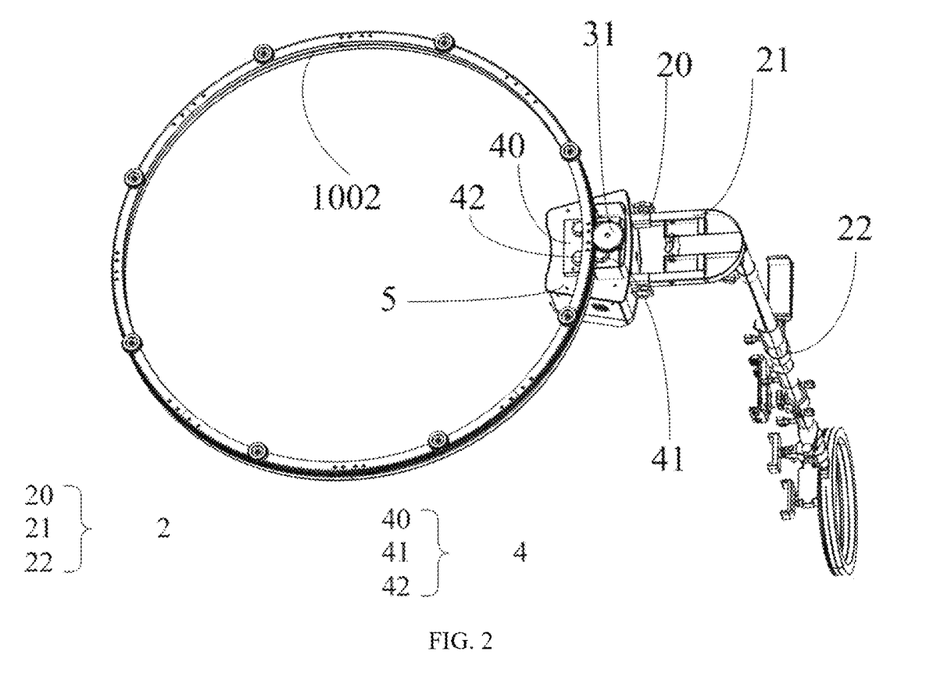
FIG. 2 shows another perspective view of the rotating photo booth of the present disclosure.
Figure 3:
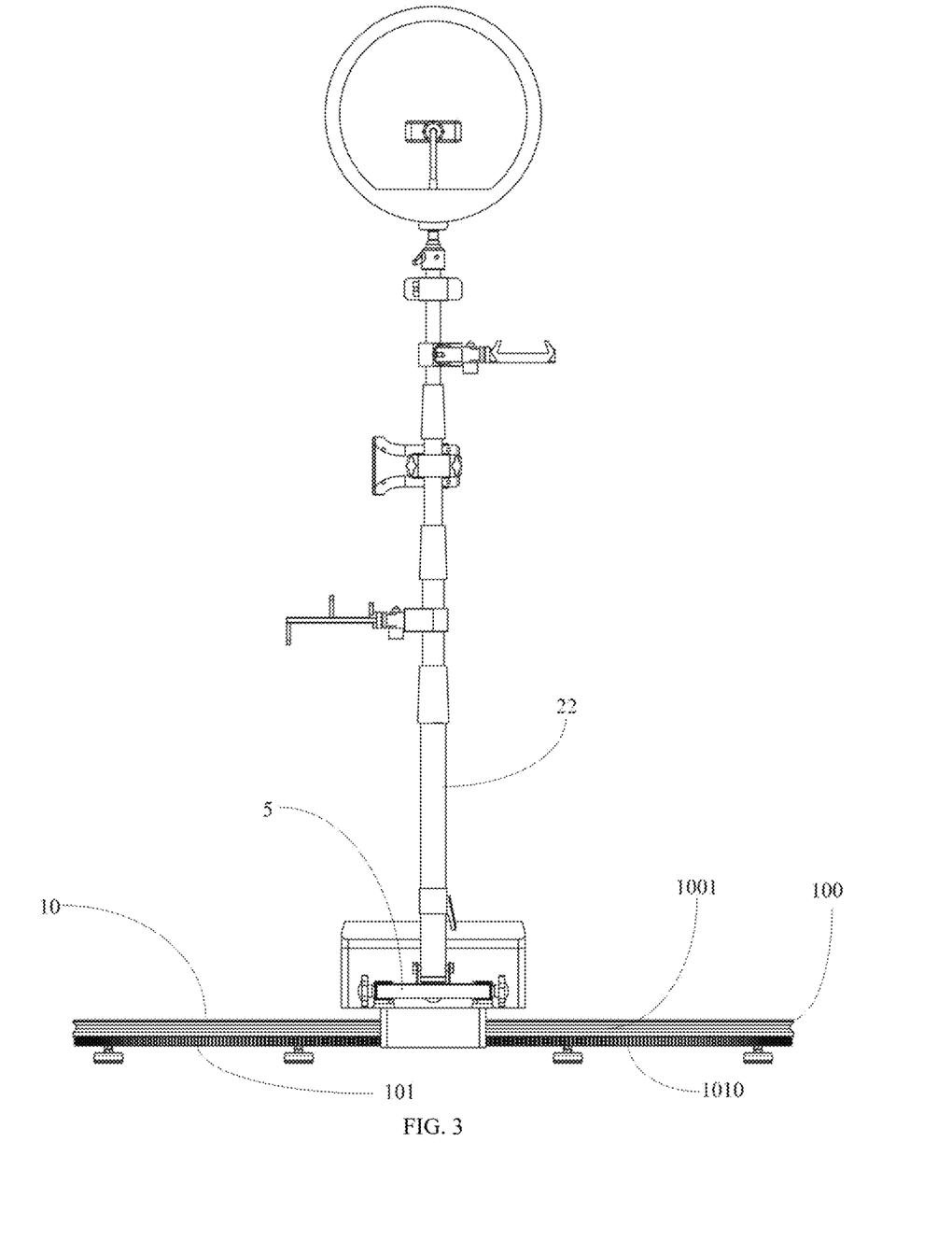
FIG. 3 shows a front view of the rotating photo booth of the present disclosure.

As shown in FIGS. 1-3 and 5, the base unit 1 includes a supporting skeleton 10, which can be set in a circular or ring shape. The supporting skeleton 10 is provided with an annular rail and a tooth surface 1010, which extend along the outer circumferential surface of the supporting skeleton 10. The portion of the supporting skeleton 10 with an annular rail constitutes the annular rail component 100, and the portion of the supporting skeleton 10 with a tooth surface 1010 constitutes the annular toothed guiding component 101. As shown in FIG. 3, the annular rail component 100 is positioned above the annular toothed guiding component 101. The supporting skeleton 10 can be made of high-strength materials such as steel to provide support for the rotating photo booth. As shown in FIGS. 1-2, the base unit 1 and the supporting skeleton 10 are circular or ring-shaped.

The annular rail and the tooth surface 1010 are arranged along the circumferential direction of the base unit 1 and the supporting skeleton 10.

Figure 5:
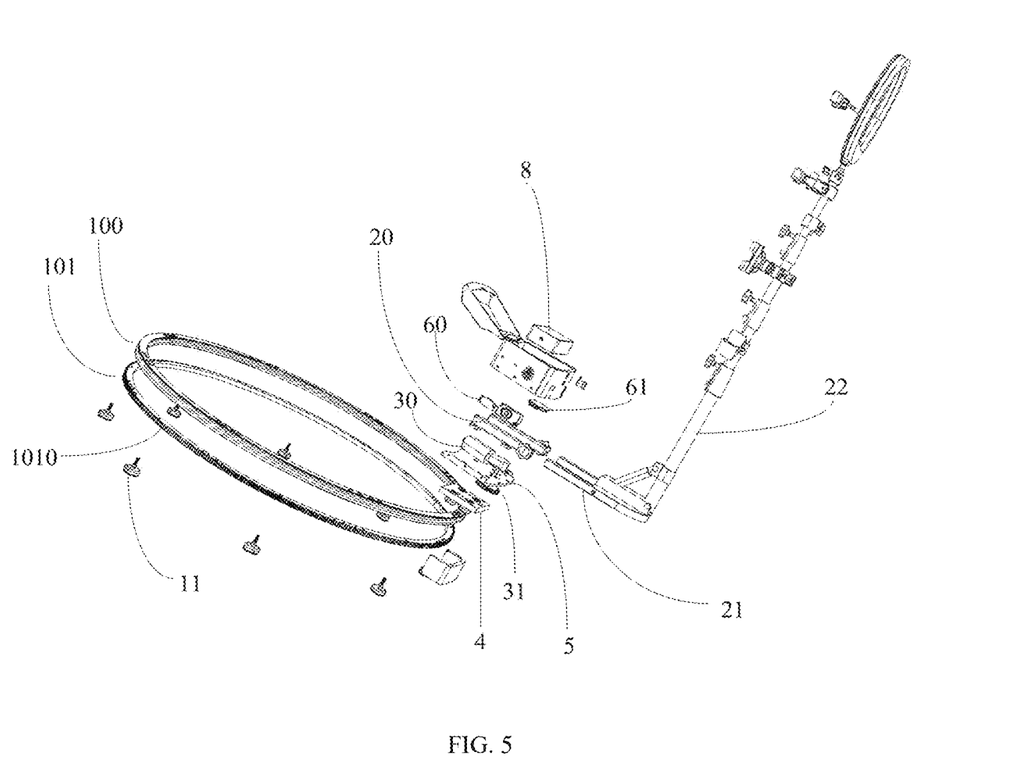
FIG. 5 shows an exploded view of the rotating photo booth of the present disclosure.

In one embodiment, as shown in FIG. 5, the annular rail component 100 is detachably connected to the annular toothed guiding component 101. Of course, the annular rail component 100 and the annular toothed guiding component 101 can also be integrally formed. As shown in FIG. 5, the annular rail component 100 is positioned above the annular toothed guiding component 101. The annular rail component 100 and the annular toothed guiding component 101 can be made of metal, and the annular rail component 100 and/or the annular toothed guiding component 101 can be segmented into multiple sections, greatly saving packaging consumables and facilitating transportation.

Figure 4:
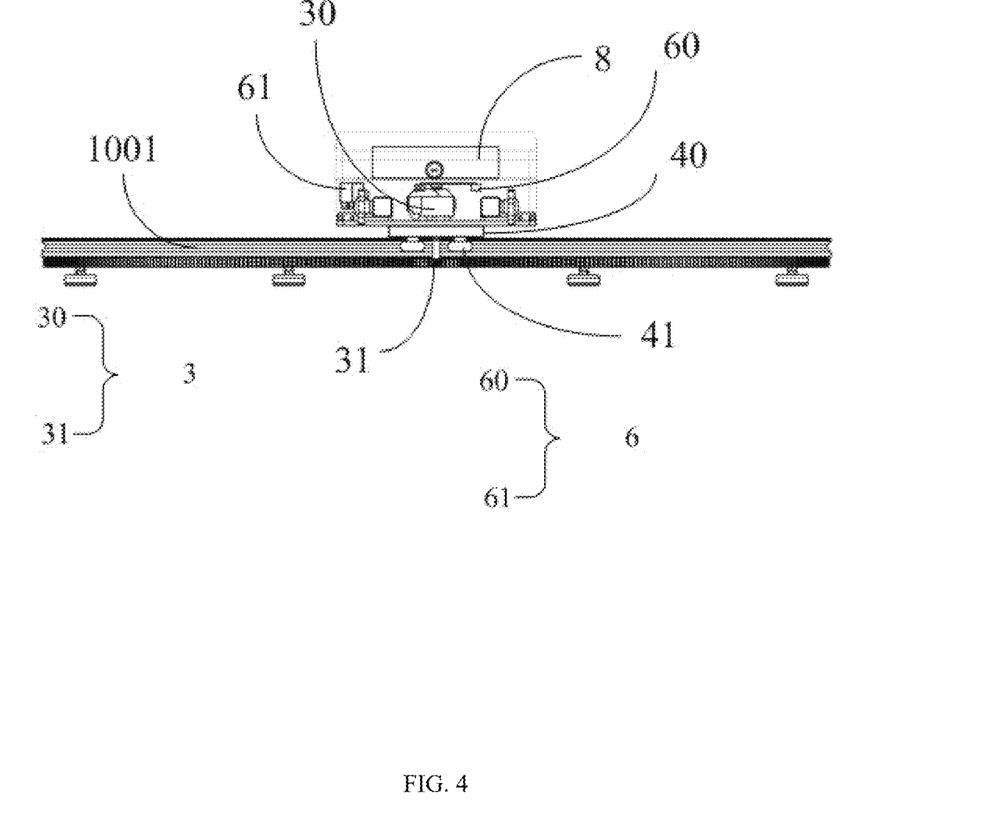
FIG. 4 shows the driving control unit and the power module of the rotating photo booth of the present disclosure.

As shown in FIG. 4, the driving unit 3 includes a motor 30 and a driving wheel 31 connected to the output end of the motor 30. The driving wheel 31 is provided with a driving tooth surface that meshes with the tooth surface 1010 of the annular toothed guiding component 101. When the rotating photo booth is in use, the annular toothed guiding component 101 remains stationary, causing the driving wheel 31 to rotate along the tooth surface 1010 of the annular toothed guiding component 101 under the driving of the motor 30, and generate circumferential thrust relative to the tooth surface 1010 towards the driving wheel 31.

As shown in FIGS. 2-3, the annular rail component 100 includes a first circle rail 1001 and a second circle rail 1002, which constitute the annular rail of the annular rail component 100. As shown in FIGS. 1-3, the first circle rail 1001 and the second circle rail 1002 are grooves located on the radially outer side 1003 and the radially inner side 1004 of the annular rail component 100. The grooves extend along the radial outer side 1003 and radial inner side 1004 of the annular rail component 100 to form trenches. The trajectories of the first circle rail 1001 and the second circle rail 1002 form concentric circles, and the radius of the trajectory of the first circle rail 1001 is greater than that of the trajectory of the second circle rail 1002.

As shown in FIG. 2, the sliding unit 4 includes a first pulley component 41, a second pulley component 42, and a sliding plate 40. The first pulley component 41 matches the first circle rail 1001, and the second pulley component 42 matches the second circle rail 1002. That is to say, the first pulley component 41 can slide in the first circle rail 1001, and the second pulley component 42 can slide in the second circle rail 1002. The first pulley component 41 and the second pulley component 42 may include more than one pulley. For example, the first pulley component 41 may include two pulleys, and the second pulley component 42 may include two pulleys. The first pulley component 41 and the second pulley component 42 are installed on the sliding plate 40. Specifically, the first pulley component 41 and the second pulley component 42 are installed at the lower end of the sliding plate 40, so that the sliding unit 4 can move around the annular rail component 100 or the base unit 1 along the first circle rail 1001 and the second circle rail 1002. The sliding plate 40 can be made of high-strength metal to ensure the rigidity of the sliding plate 40 during the movement of the sliding unit 4 and avoid deformation. The first pulley component 41, the second pulley component 42, and the annular rail can restrict the axial or radial movement of the sliding unit 4 on the annular rail, but do not restrict the circumferential movement of the sliding unit 4 on the annular rail.

As shown in FIGS. 2 and 5, the rotating photo booth also includes a first connection unit 5, which is used to carry the photographic bracket 2, the driving unit 3, and the sliding unit 4. The sliding plate 40 is connected to the first connecting unit 5 on the side away from the first pulley component 41 and the second pulley component 42. The first connection unit 5 can be plate-shaped.

As shown in FIG. 2, the photographic bracket 2 includes a second connection unit 20 connected to the first connection unit 5, a third connection unit 21 detachably connected to the second connection unit 20, and a telescopic rod 22 connected to the third connection unit 21. The telescopic rod 22 is configured to connect photographic device. For example, the telescopic rod 22 can be used to fix various auxiliary equipment, such as fill lights, mobile phones, cameras, tablets, etc. The users can adjust the height of the telescopic rod as needed. As shown in FIGS. 1-2 and 5, the telescopic rod 22 is vertically arranged relative to the base unit 1, while the second connecting unit 20 and the third connecting unit 21 are horizontally arranged. The third connection unit 21 can be adjusted by pushing and pulling relative to the second connection unit 20, making it easier to adjust the distance between the telescopic rod 22 and the base unit 1 as needed. The second connection unit 20 and the third connection unit 21 can be cantilever-shaped.

As shown in FIGS. 1-2 and 5, the telescopic rod 22 is rotatably connected to the third connection unit 21, and an angle adjustment arm 24 is also connected between the telescopic rod 22 and the third connection unit 21. The angle adjustment arm 24 forms a triangular fixed structure between the telescopic rod 22 and the third connection unit 21.

As shown in FIG. 4, the rotating photo booth also includes a driving control unit 6, which includes a voice control device 60 and a speaker device 61. The voice control device 60 is configured to control the startup, shutdown, speed adjustment, and direction adjustment (forward and reverse) of the rotating photo booth through voice commands, and the speaker device 61 is configured to produce sound in response to voice commands. The rotating photo booth also includes a power module 8. The power module 8 is used to supply power to the voice control device 60, the speaker device 61, and the driving unit 3. The power module 8 may include a portable power bank, and the users can remove the power module 8 from the rotating photo booth for charging, or charge the power module 8 through the charging socket set on the rotating photo booth.

As shown in FIGS. 1 and 5, the base unit 1 also includes multiple supporting legs 11, which support the base unit 1 and can be used to adjust the height of the base unit 1. Specifically, the supporting legs 11 can be set at the lower end of the annular toothed guiding component 101.

As shown in FIGS. 2-3, the rotating photo booth also includes a control box housing and a control box cover, and the control box cover can be opened or closed relative to the control box housing. The control box housing is used to accommodate the driving unit 3, the driving control unit 6, and the power module 8.

As shown in FIGS. 2-3, a baffle is also installed at the lower end of the first connection unit 5. When the driving unit 3 drives the first connection unit 5 to perform a surrounding motion, the baffle can prevent the motor 30, pulley, and drive wheel 31 from being exposed during the surrounding motion.

The users turn on the power of the rotating photo booth and stand on the base unit 1 when using the rotating photo booth. After the motor 30 is started, it rotates to drive the driving wheel 31 to rotate. Under the action of the tooth surface 1010 set on the outer circumference of the base unit 1, the driving wheel 31 rotates around the base unit 1 along an annular rail, and at this time, the photographic bracket 2 also synchronously rotates around the base unit 1. The users can control the forward and reverse rotation of the photographic bracket 2 by controlling the forward and reverse rotation of motor 30.

The present invention provides an annular rail and a tooth surface on the base unit, so that the photographic bracket can move around along the annular rail and the tooth surface relative to the base unit. The photographic bracket can be used to fix various auxiliary equipment, such as fill lights, mobile phones, cameras, tablets, etc. The users can capture the desired movie effect by rotating the photographic bracket while standing on the base unit.

The above description is only the preferred embodiment of the present disclosure and is not intended to limit the present disclosure. Any modifications, equivalent substitutions, and improvements made within the spirit and principles of the present disclosure should be included in the scope of protection of the present disclosure.

What is claimed is:

1. A rotating photo booth, wherein the rotating photo booth comprises:
    a base unit comprising an annular rail component;
    a photographic bracket which is rotatable around the base unit;
    a driving unit configured to drive the photographic bracket to rotate around the base unit along the annular rail component;
    a sliding unit configured to match the annular rail component, and
    a first connection unit, configured to carry the photographic bracket, the driving unit, and the sliding unit,
    wherein the base unit further comprises an annular toothed rail connected to the annular rail component, and a tooth surface of the annular toothed rail is distributed along an outer circumferential surface of the annular toothed rail,
    the driving unit comprises a motor and a driving wheel connected to an output end of the motor, the driving wheel meshes with the tooth surface of the annular toothed rail, and the annular toothed rail remains stationary, so that the driving wheel rotates along the tooth surface of the annular toothed rail under the driving of the motor,
    the annular rail component comprises a first circle rail and a second circle rail, wherein the first circle rail and the second circle rail are grooves provided on a radially outer and inner sides of the annular rail component, and the grooves extend circumferentially along the radially outer and inner sides of the annular rail component,
    the sliding unit comprises a first pulley component, a second pulley component and a sliding plate, the first pulley component matches the first circle rail, the second pulley component matches the second circle rail, the first pulley component and the second pulley component are installed on the sliding plate, and the sliding plate is installed on the first connection unit,
    the photographic bracket comprises a second connection unit connected to the first connection unit, a third connection unit detachably connected to the second connection unit, and a telescopic rod connected to the third connection unit, wherein the telescopic rod is configured to connect photographic device.

2. The rotating photo booth according to claim 1, wherein the telescopic rod is rotatably connected to the third connection unit, and an angle adjustment arm is further connected between the telescopic rod and the third connection unit, forming a triangular fixed structure between the angle adjustment arm, the telescopic rod, and the third connection unit.

3. The rotating photo booth according to claim 2, wherein the rotating photo booth further comprises a driving control unit, wherein the driving control unit comprises a voice control device and a speaker device, wherein the voice control device is configured to control power on, power off, and speed adjustment of the rotating photo booth through voice commands, and the speaker device is configured to emit sound in response to the voice commands.

4. A rotating photo booth comprising:
    a base unit comprising an annular skeleton, wherein the annular skeleton is provided with an annular rail and a tooth surface, and the annular rail and the tooth surface extend along an outer circumferential surface of the annular skeleton;
    a photographic bracket which is rotatable around the base unit;
    a driving unit configured to drive the photographic bracket to rotate around the base unit along the annular rail; and
    a sliding unit configured to match the annular rail,
    wherein the portion of the annular skeleton provided with the annular rail constitutes an annular rail component, and the portion of the annular skeleton provided with the tooth surface constitutes an annular toothed rail,
    the driving unit comprises a motor and a driving wheel connected to an output end of the motor, the driving wheel meshes with the tooth surface of the annular toothed rail, and the annular toothed rail remains stationary, so that the driving wheel rotates along the tooth surface of the annular toothed rail under the driving of the motor,
    the annular rail component comprises a first circle rail and a second circle rail, wherein the first circle rail and the second circle rail are grooves provided on a radially outer and inner sides of the annular rail component, and the grooves extend circumferentially along the radially outer and inner sides of the annular rail component,
    the sliding unit comprises a first pulley component and a second pulley component, wherein the first pulley component matches the first circle rail, and the second pulley component matches the second circle rail,
    the rotating photo booth further comprises a first connection unit, wherein the first connection unit is used to carry the photographic bracket, the driving unit, and the sliding unit,
    the sliding unit further comprises a sliding plate, the first pulley component and the second pulley component are installed on the sliding plate, and the sliding plate is installed on the first connection unit,
    the photographic bracket comprises a second connection unit connected to the first connection unit, a third connection unit detachably connected to the second connection unit, and a telescopic rod connected to the third connection unit, and the telescopic rod is configured to connect photographic device, and the telescopic rod is rotatably connected to the third connection unit, and an angle adjustment arm is further connected between the telescopic rod and the third connection unit, forming a triangular fixed structure between the angle adjustment arm, the telescopic rod, and the third connection unit.

5. The rotating photo booth according to claim 4, wherein the rotating photo booth further comprises a driving control unit, wherein the driving control unit comprises a voice control device and a speaker device, wherein the voice control device is configured to control power on, power off, and speed adjustment of the rotating photo booth through voice commands, and the speaker device is configured to emit sound in response to the voice commands.

\* \* \* \* \*